United States Patent [19]
Schöder et al.

[11] Patent Number: 5,553,693
[45] Date of Patent: Sep. 10, 1996

[54] HYDROKINETIC TORQUE CONVERTER WITH LOCK-UP CLUTCH

[75] Inventors: Bernd Schöder, Münnerstadt; Johannes Sossnitza, Unterspiesheim; Jürgen Demgensky, Schweinfurt; Josef Riedmann, Arnstein; Horst Jädicke, Gochsheim; Wilfried Glock, Dittelbrunn-Hambach; Friedrich Schramm, Schonungen-Forst, all of Germany

[73] Assignee: Fichtel & Sachs AG, Schweinfurt, Germany

[21] Appl. No.: 263,772

[22] Filed: Jun. 22, 1994

[30] Foreign Application Priority Data

Jun. 23, 1993 [DE] Germany ..................... 43 20 768.5
May 7, 1994 [DE] Germany ..................... 44 16 263.4

[51] Int. Cl.⁶ .................................................. F16H 45/02
[52] U.S. Cl. .................................. 192/3.29; 29/889.5
[58] Field of Search ........................... 192/3.28, 3.29, 192/3.3; 29/889.5, 889

[56] References Cited

U.S. PATENT DOCUMENTS

| | | | |
|---|---|---|---|
| 2,858,675 | 11/1958 | Schneider | 192/3.28 X |
| 2,920,728 | 1/1960 | Förster | 192/3.29 |
| 4,128,999 | 12/1978 | Yokoyama et al. | |
| 5,215,173 | 6/1993 | Gimmler | 192/3.29 X |
| 5,377,796 | 1/1995 | Friedmann et al. | 192/3.29 |

FOREIGN PATENT DOCUMENTS

| | | |
|---|---|---|
| 3823210 | 1/1990 | Germany. |
| 1352465 | 5/1974 | United Kingdom. |
| 1374090 | 11/1974 | United Kingdom. |
| 2118643 | 11/1983 | United Kingdom. |
| 2221263 | 1/1990 | United Kingdom. |

*Primary Examiner*—Rodney H. Bonck
*Attorney, Agent, or Firm*—Nils H. Ljungman and Associates

[57] ABSTRACT

Hydrokinetic torque converter with a lock-up clutch, which is equipped with one or more friction plates to increase the transmission capacity or to reduce the internal pressure, whereby at least a portion of the wall of the turbine wheel and the components holding the corresponding friction plate are designed as one piece.

20 Claims, 8 Drawing Sheets

5,553,693

HYDROKINETIC TORQUE CONVERTER WITH LOCK-UP CLUTCH

BACKGROUND OF THE INVENTION

1. Field of the Invention

The present invention generally relates to a hydrokinetic torque converter with a lock-up clutch. The torque converter generally includes a housing driven by an internal combustion engine with a housing wall near the drive of the internal combustion engine, which housing wall is provided with a concentric guide hub. The torque converter also generally includes a pump wheel integrated into the housing wall away from the drive, and a turbine wheel located between the pump wheel and the housing wall near the drive. The turbine wheel is non-rotationally connected by means of a turbine wheel hub to the output. The torque converter can further include a stator located between the pump wheel and the turbine wheel, and a lock-up clutch between the housing wall near the drive and the turbine wheel.

The lock-up clutch generally includes a piston, which piston, in the radially external portion on the side facing the housing wall near the drive has a friction surface, which friction surface is opposite a corresponding friction surface of the housing wall. In the radially inner portion, the piston is sealed in relation to a hub, and both the space between the piston and the housing wall near the drive, and the space between the piston and the housing wall away from the drive, each have a connection for pressurizable converter fluid.

2. Background Information

A hydrokinetic torque converter with lock-up clutch and drive-side mounting of the piston is disclosed by German Laid Open Patent Application DE-OS 38 23 210, whereby, to increase the transmission capacity and to reduce the internal pressure, the hydrokinetic torque converter is equipped with an additional friction plate. To reduce the load on the housing of the torque converter, the piston of the lock-up clutch is mounted opposite the housing wall near the drive and is connected non-rotationally to it. Between the two friction surfaces there is a friction plate which extends radially outwardly beyond the piston, where the friction plate has lugs for the non-rotational but axially loose connection with slots of a hollow cylindrical component. This hollow cylindrical component is then rigidly connected to the turbine wheel. The hollow cylindrical component, in the area facing away from the slots, is partly fitted to the external contour of the turbine wheel, and in this area is rigidly connected to its outer shell, e.g. by means of a weld seam.

OBJECT OF THE INVENTION

The object of the present invention is to improve a torque converter of the type described above, so that while retaining the transmission capacity of the lock-up clutch, and retaining the transmission capacity without a pressure increase in the converter fluid, it is possible to have an economical connection between the friction plate and the turbine wheel, which is favorable from a manufacturing point of view.

SUMMARY OF THE INVENTION

This object can preferably be achieved by designing at least part of the turbine wall near the drive, and the components holding the corresponding friction plate or the Several friction plates, as one piece, and forming a positive interlock, or possibly a form fit.

One advantage of this configuration is that, with an appropriate structure and geometric configuration of the turbine wheel, the corresponding fastening components for the friction plate can essentially be eliminated.

In an additional, economical embodiment of the present invention, which has advantages from the point of view of manufacturing technology, the turbine wall and the components can preferably be shaped in a non-cutting manner, and can preferably be designed as one piece. By means of an appropriate shaping or structural geometry, the turbine wheel housing wall near the drive can be manufactured preferably from sheet metal in a non-cutting manner.

In one geometrically advantageous embodiment, the turbine wall preferably first extends axially toward the friction plate, and then toward the pump wheel.

In an additional advantageous embodiment, the turbine wall, starting from the pump wheel, preferably extends axially toward the friction plate.

An additional advantageous feature is that the turbine wall, and also possibly the housing wall, are preferably designed as deep-drawn parts.

In an additional configuration, the friction plate is preferably connected essentially directly to the turbine wall.

One aspect of the invention resides broadly in a hydrokinetic lockup torque converter, such as for a motor vehicle, the torque converter comprising: a longitudinal axis; the torque converter being disposed substantially concentrically about the longitudinal axis; a housing; the housing comprising: a first housing wall portion having means for being disposed adjacent a source of torque; a second housing wall portion disposed at an axial distance from the first housing wall portion; a pump wheel, the pump wheel being disposed adjacent the second housing wall portion; a turbine wheel, the turbine wheel being disposed between the pump wheel and the first housing wall portion; the turbine wheel having means for being disposed on an output shaft; a lockup clutch disposed between the first housing wall portion and the turbine wheel; the lockup clutch comprising: at least one friction plate disposed between the turbine wheel and the first housing wall portion; the turbine wheel comprising: a turbine wall portion; the turbine wall portion comprising: a first portion and a second portion; an inner turbine wall surface comprising: a first portion disposed adjacent the blades of the turbine wheel and disposed towards the pump wheel; and a second portion extending axially outwardly towards the first housing wall portion; an outer turbine wall surface disposed opposite the inner turbine wall surface and disposed away from the blades of the turbine wheel; the first portion of the inner turbine wall surface being disposed on the first portion of the turbine wall portion; the second portion of the inner turbine wall surface being disposed on the second portion of the turbine wall portion; and means for connecting the turbine wall portion to the at least one friction plate, the means for connecting being at least substantially adjacent to the second portion of the turbine wall portion.

Another aspect of the invention resides broadly in a method of making a hydrokinetic lockup torque converter, such as for a motor vehicle, the torque converter comprising: a longitudinal axis; the torque converter being disposed substantially concentrically about the longitudinal axis; a housing; the housing comprising: a first housing wall portion having means for being disposed adjacent a source of torque; a second housing wall portion disposed at an axial distance from the first housing wall portion; a pump wheel, the pump wheel being disposed adjacent the second housing wall portion; a turbine wheel, the turbine wheel being disposed between the pump wheel and the first housing wall portion; the turbine wheel having means for being disposed on an output shaft; a lockup clutch disposed between the first housing wall portion and the turbine wheel; the lockup clutch comprising at least one friction plate disposed between the turbine wheel and the first housing wall portion; the turbine wheel comprising a turbine wall portion; the turbine wall portion comprising: a first portion and a second portion; an inner turbine wall surface comprising: a first portion disposed adjacent the blades of the turbine wheel and disposed towards the pump wheel, and a second portion extending axially outwardly towards the first housing wall portion; an outer turbine wall surface disposed opposite the inner turbine wall surface and disposed away from the blades of the turbine wheel; the first portion of the inner turbine wall surface being disposed on the first portion of the turbine wall portion; the second portion of the inner turbine wall surface being disposed on the second portion of the turbine wall portion; the turbine wheel further comprising means for connecting the turbine wall portion to the at least one friction plate, the means for connecting being at least substantially adjacent to the second portion of the inner turbine wall surface; the method comprising the steps of: providing a housing; the step of providing the housing comprising: providing a first housing wall portion having means for being disposed adjacent a source of torque; providing a second housing wall portion; providing a pump wheel; providing a turbine wheel, the turbine wheel having means for being disposed on an output shaft; providing a lockup clutch; the step of providing the lockup clutch comprising: providing at least one friction plate; the step of providing the turbine wheel comprising: providing a turbine wall portion; the step of providing the turbine wall portion comprising: providing a first portion and a second portion; providing an inner turbine wall surface; the step of providing the inner turbine wall surface comprising: providing a first portion; and providing a second portion extending axially outwardly towards the first housing wall portion; providing an outer turbine wall surface; providing means for connecting the turbine wall portion to the at least one friction plate; the method further comprising the additional steps of: disposing the second housing wall portion at an axial distance from the first housing wall portion; disposing the pump wheel adjacent the second housing wall portion; disposing the turbine wheel between the pump wheel and the first housing wall portion; disposing the lockup clutch between the first housing wall portion and the turbine wheel; disposing the friction plate between the turbine wheel and the first housing wall portion; disposing the first portion of the inner turbine wall portion adjacent the blades of the turbine wheel and disposing the first portion of the inner turbine wall portion towards the pump wheel; disposing the outer turbine wall surface opposite the inner turbine wall surface and disposing the outer turbine wall surface away from the blades of the turbine wheel; disposing the connecting means at least substantially adjacent to the second portion of the turbine wall portion; the method still further comprising the additional steps of: forming the first portion of the inner turbine wall surface on the first portion of the turbine wall portion; forming the second portion of the inner turbine wall surface on the second portion of the turbine wall portion, and extending the second portion axially outwardly towards the first housing wall portion; and attaching the friction plate to the connecting means of the turbine wall portion.

BRIEF DESCRIPTION OF THE DRAWINGS

Preferred embodiments of the invention are illustrated schematically in the accompanying figures, in which.

DESCRIPTION OF THE PREFERRED EMBODIMENT

Figure 1:
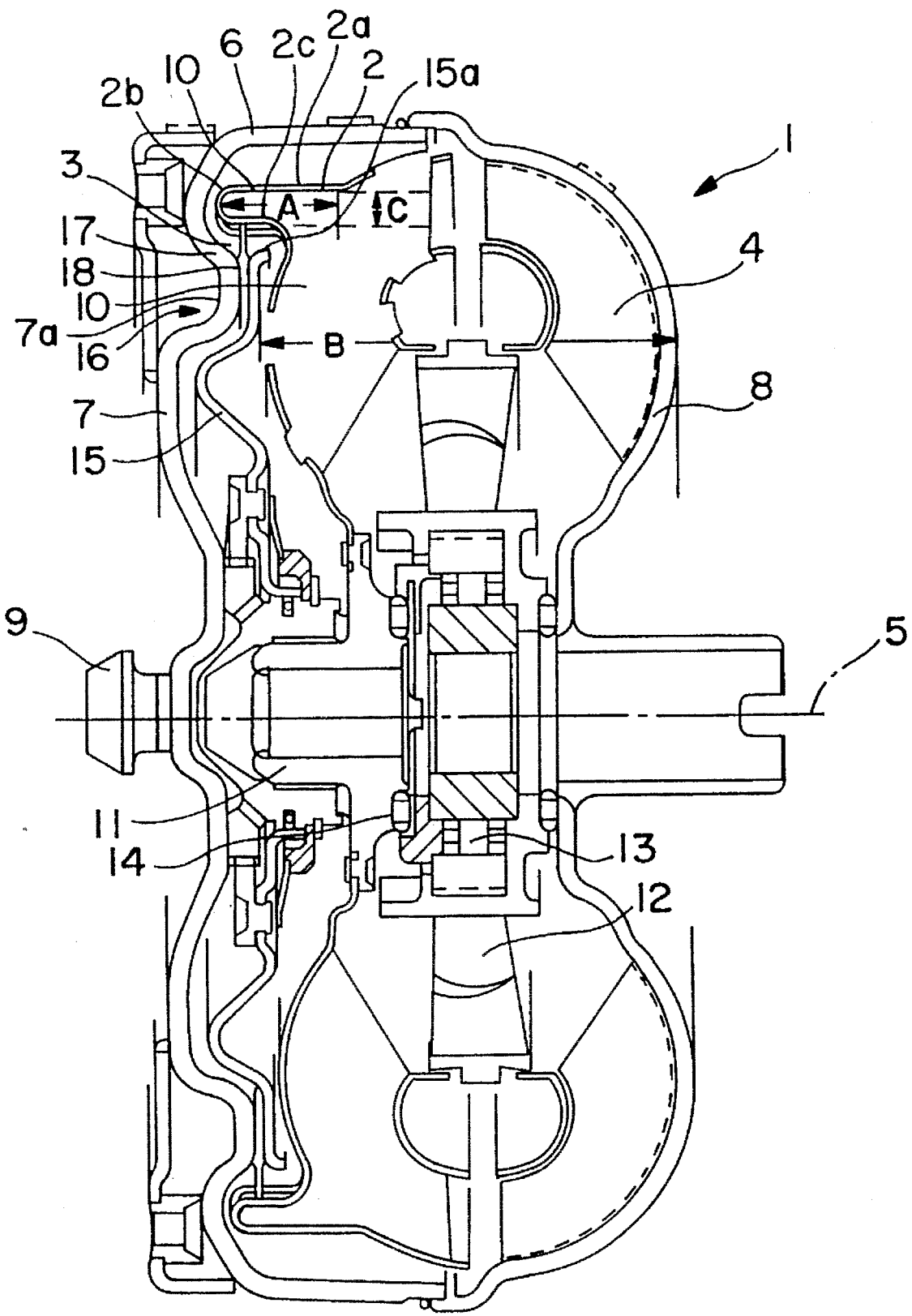
FIG. 1 shows a longitudinal section through a hydrokinetic torque converter.

FIG. 1 shows a longitudinal section through a hydrokinetic torque converter 1 which is oriented concentric to an axis of rotation 5. The internal combustion engine (not shown) is preferably on the left side, and is preferably connected in a substantially non-rotational manner to the housing 6. The housing 6 can preferably include a housing wall 7 near the drive of the internal combustion engine, and a housing wall 8 away from the drive of the internal combustion engine.

The housing wall 7 is preferably rigidly connected in a radially inner portion to a guide hub 9, which guide hub 9 is preferably guided radially with an extension in the flywheel or in the crankshaft of an internal combustion engine. The housing wall 8, which is preferably disposed away from the drive of the internal combustion engine, is preferably combined with the pump wheel 4 of the hydrokinetic torque converter 1, preferably into a single component. Preferably, between the pump wheel 4 and the housing wall 7 near the drive, there is also the turbine wheel 10, which turbine wheel 10 is preferably rigidly connected to a turbine wheel hub 11. The turbine wheel hub 11 can preferably be located by means of gear teeth on an output shaft (not shown). A stator 12 is preferably located between the turbine wheel 10 and the pump wheel 4. The stator 12 is preferably guided by means of a freewheel mechanism 13 and a blade wheel hub 14, which blade wheel hub 14 is preferably mounted by means of gear teeth on a tube (not shown), which tube can preferably be fixed to the housing.

The piston 15 of the lock-up clutch 16 is preferably located between the turbine wheel 10 and the housing wall 7 near the drive. The piston 15, in the vicinity of its outside diameter, pointing away from the housing wall 7, is preferably provided with a reinforcement collar and also with a friction surface 17, which friction surface 17 preferably faces the housing wall 7. This reinforcement collar, in one preferred embodiment, can preferably be configured as indicated by reference number 15a. In the outside diameter area of the piston 15, on the inside of the housing wall 7, there is preferably an additional friction surface 18, which friction surface 18 is opposite the friction surface 17 of the piston 15. A friction plate 3 is preferably located between the two friction surfaces 17 and 18, which friction plate 3 extends radially outward beyond the piston 15, where the friction plate 3 is preferably connected in a substantially non-rotating fashion to the turbine wheel 10.

The connection between friction plate 3 and turbine wall 2, in at least one embodiment of the present invention, is preferably a connection which permits the friction plate 3 to move axially, but not substantially rotatably, with respect to turbine wall 2. This connection could preferably be achieved by providing at least one slot along or in the circumference of the turbine wall 2, preferably in the vicinity of the radially outward surface of the friction plate 3. The friction plate could then preferably have at least one radially extending projection, on and/or along the circumference of the friction plate 3, which projections would preferably fit into the slots in the turbine wall 2. Thus, the projections of the friction plate 3 could preferably move axially, while remaining substantially torsionally stationary with respect to the turbine wall 2. Further the connection between the friction plate 3 and the turbine wall 2 is preferably analogous to, or substantially identical to that disclosed in U.S. Pat. No. 4,926,988, which issued to Kundermann on May 22, 1990, entitled "Hydrodynamic Clutch". Of course, the connection between friction plate 3 and the turbine wall 2 could conceivably be accomplished by other suitable methods, and is not to be taken as limited to the connection described above. The housing wall 7, in one preferred embodiment, can have a curved or "dipped" portion 7a. In other words, portion 7a is preferably indented towards the turbine wheel 10. By configuring the housing wall 7 in this manner, the curved portion 7a can preferably serve as the location for the friction surface 18. The friction surface 18, by being incorporated directly into the housing wall 7, can essentially eliminate the need for a separate friction surface component, thus possibly reducing manufacturing costs. Such friction surface components were typically used in torque converters of the past. Further, "dipped" portion 7a of the housing wall 7 may be formed by a deep-drawing process.

In FIG. 1, the wall 2 of the turbine wheel 10, preferably in a radially outer portion, first preferably extends axially toward the friction plate 3 and then past the friction plate 3, and then axially toward the pump wheel 4. The friction plate 3 can preferably be attached in a substantially non-rotational manner either directly or indirectly to the wall 2 of the turbine wheel 10.

In other words, with particular reference to FIG. 1, the wall 2 of the turbine wheel 10 can preferably have a substantially straight portion 2a, which portion 2a can extend in the axial direction towards the friction plate 3, as discussed above. The wall 2 then can preferably curve at or near point 2b and extend in a substantially radial direction, towards the axis of rotation 5. Finally, the wall 2 can then curve once again and extend into an additional substantially straight portion 2c, which portion 2c then preferably extends in the axial direction towards the pump wheel 4. Thus, at least part of portion 2a is substantially parallel to portion 2c. Further, portions 2a, 2c, and turbine wall 2 are, in at least one embodiment of the present invention, of one piece.

The wall 2 shown in the embodiments illustrated in FIG. 1 may also preferably be formed by a deep-drawing process. The width of the turbine wall 2, as shown in FIG. 1 and labeled "A", is approximately ¼ of the total width of the pump wheel 4 and the turbine wheel 10 together, as shown in FIG. 1 and labeled "B". Further, height or depth of the turbine wall 2, as shown in FIG. 1 and labeled "C", is approximately ⅕ of the width "A" of the turbine wall 2.

Figure 2:
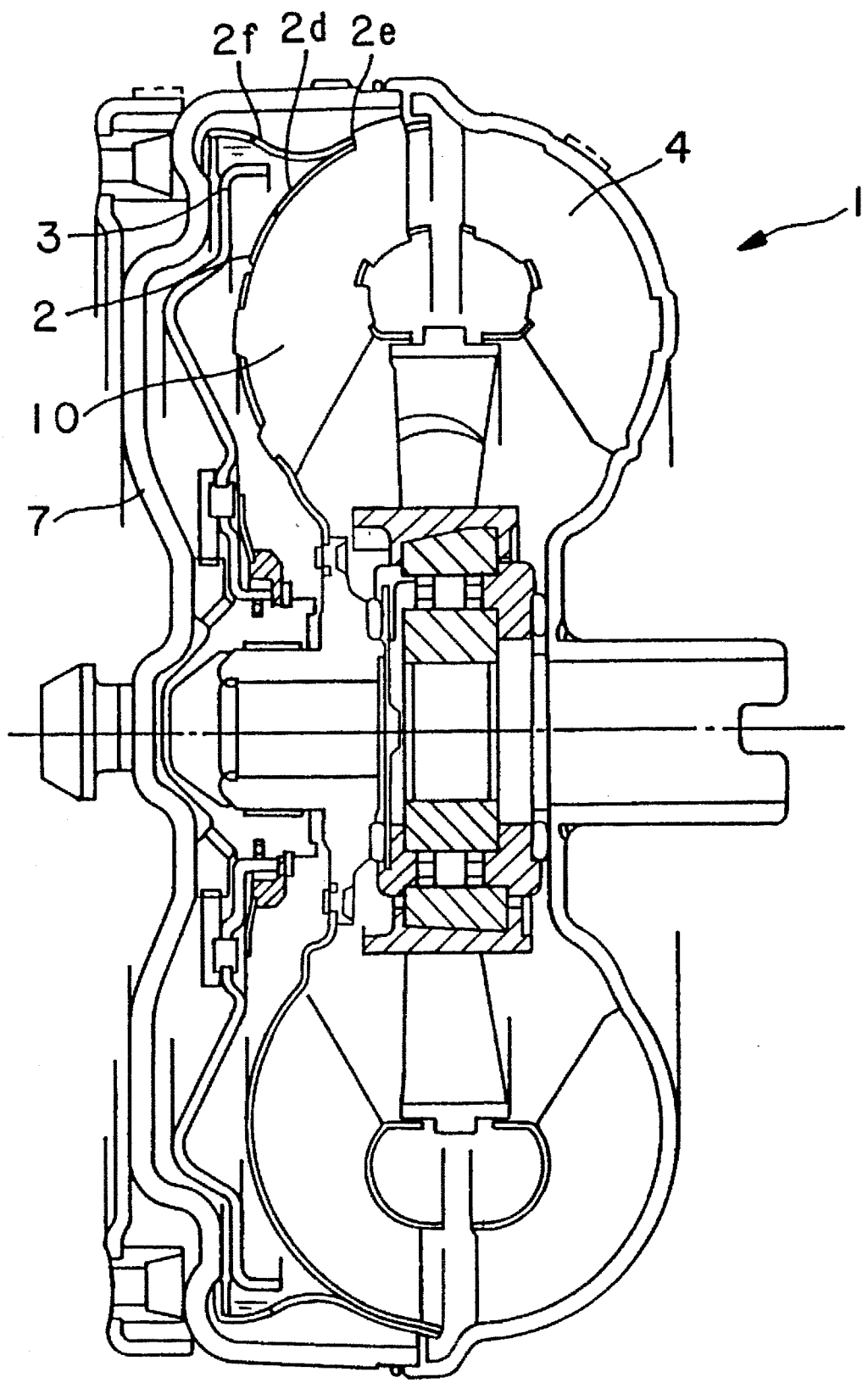
FIG. 2 shows an additional embodiment of a torque converter with a varying geometric configuration of the turbine wheel housing wall near the drive.

FIG. 2 illustrates an additional embodiment of a hydrokinetic torque converter 1 according to the present invention, whereby the wall 2 of the turbine wheel 10, along its radius, preferably first extends toward the pump wheel 4 and then, bent by approximately 180 degrees, extends toward the housing wall 7 near the drive, whereby in the terminal portion of the friction plate 3, the friction plate 3 is preferably non-rotationally connected to the wall 2 of the turbine wheel 10.

In other words, with particular reference to FIG. 2, the wall 2 of the turbine wheel 10 preferably has a curved portion 2d, which curved portion 2d preferably extends towards the pump wheel 4. Portion 2d then preferably is bent or doubles back towards housing wall 7 at or near point 2e. At or near point 2e, a portion 2f of turbine wall 2 then preferably curves upwardly towards housing wall 7. Thus, the turbine wall 2, portion 2d and portion 2f are, in at least one embodiment of the present invention, of one piece, such as one continuous piece.

In an alternative embodiment of the present invention, portions 2d and 2f could be considered to be a projection of the turbine wall 2. This projection may be continuous about the circumference of the turbine wheel 10, or alternatively, there could be a number of projections about the turbine wheel 10. The number of projections could be one, two, three, four, five, six, seven, eight, nine, ten, eleven, twelve, thirteen, fourteen, fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, thirty-one, thirty-two, thirty-three, thirty-four, thirty-five, thirty-six, thirty-seven, thirty-eight, thirty-nine, or forty. It should be noted that the lower numbers given above, such as one, two, three, or four, would most likely not be adequate, however, it is conceivable that these lower numbers could be adequate in some cases. It should also be noted that the number of projections is not to be taken as limited to those given above. The projection could then be folded or bent back to form portion 2f, on which portion 2f the friction plate 3 could preferably be attached.

Figure 3:
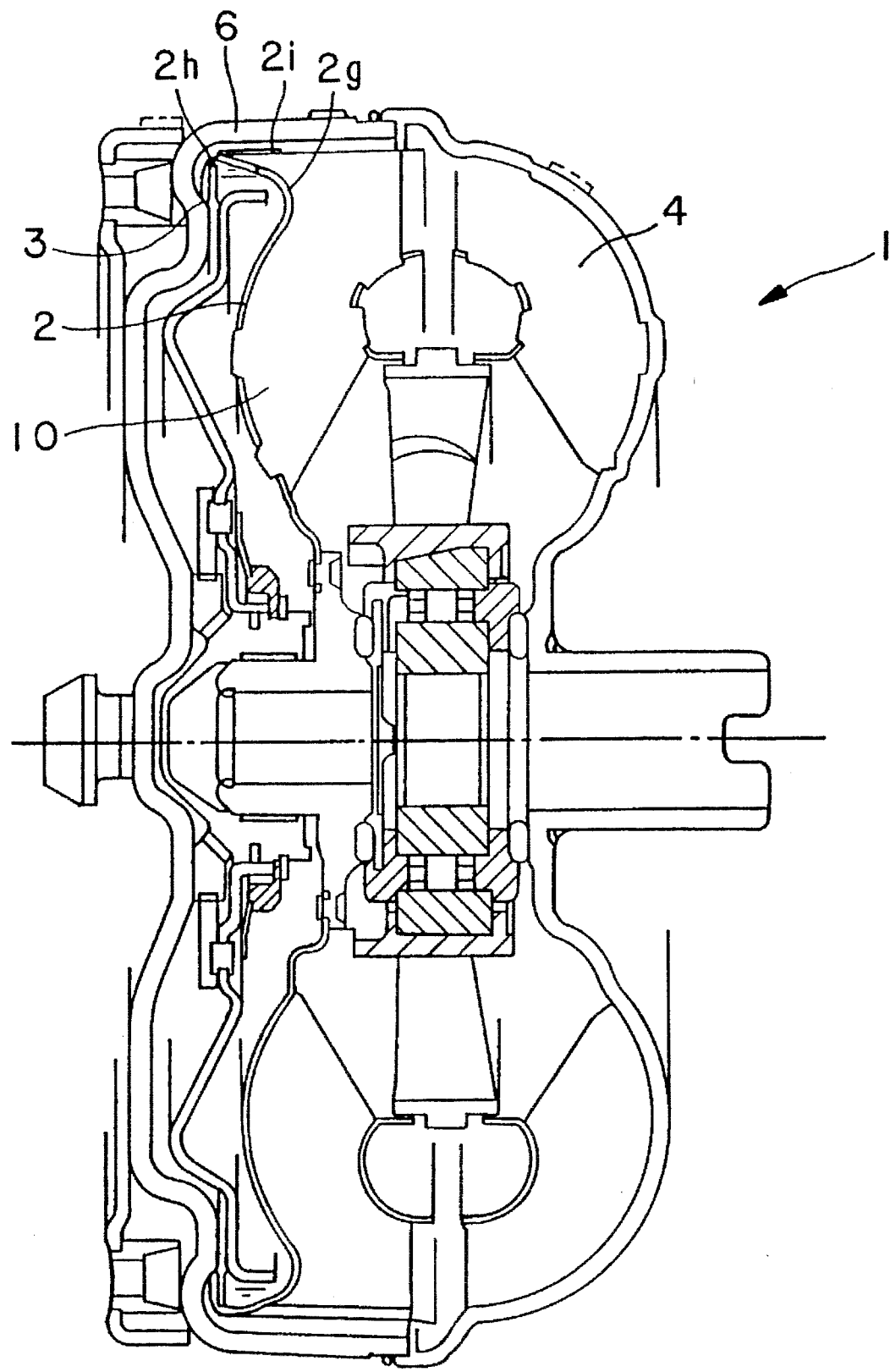
FIG. 3 shows an additional embodiment of a torque converter with a varying geometric configuration of the turbine wheel housing wall near the drive.

FIG. 3 illustrates an additional embodiment of a hydrokinetic torque converter 1 according to the present invention in which the wall 2 of the turbine wheel 10 preferably first runs in a curve in the general direction of the friction plate 3, and then is oriented approximately parallel to the housing 6 toward the pump wheel 4.

In other words, and with particular reference to FIG. 3, the wall 2 preferably has a portion 2g which curves upwardly in the general direction of the friction plate 3, and then preferably is bent or doubles back towards the pump wheel 4 at or near point 2h. Starting at or near point 2h, the wall 2 can have a portion 2i which is substantially straight and runs substantially parallel to housing wall 6 towards the pump wheel 4. Thus, the turbine wall 2, portions 2g and 2i are, in at least one embodiment of the present invention, of one piece, such as one continuous piece.

Figure 4:
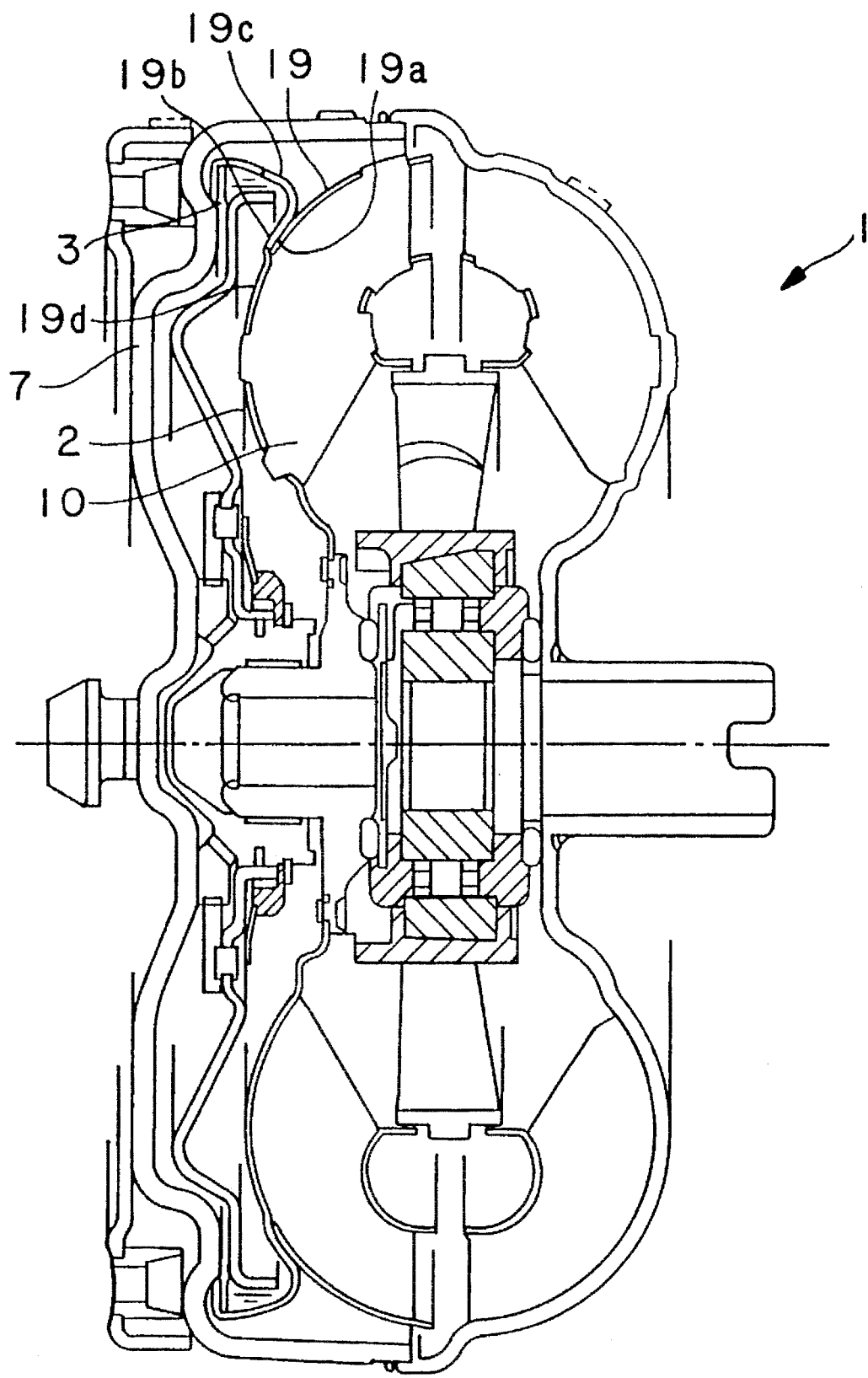
FIG. 4 shows an additional embodiment of a torque converter with a varying geometric configuration of the turbine wheel housing wall near the drive.

FIG. 4 illustrates yet another embodiment of a hydrokinetic torque converter 1 according to the present invention in which the wall 2 of the turbine wheel 10, preferably in the radially external portion, extends toward the housing wall 7 near the drive and is preferably connected to the friction plate 3. A portion of the wall 2 of the turbine wheel 10 is preferably designed as a separate component 19, whereby this separate component 19 is preferably appropriately connected to the wall 2 of the turbine wheel 10. Further, at an area 19a where separate component 19 preferably meets the turbine wall 2, a seal may be formed between wall 2 and component 19. Further, the connection between component 19 and turbine wall 2 at or near area 19a may, in at least one embodiment of the present invention, comprise a weld. Alternatively, component 19 may have fingers or projecting portions along its circumference which projections could preferably be inserted into slots along the circumference of turbine wall 2. These fingers of component 19 could then preferably be bent or folded over to substantially conform them to surface 19b of the turbine wall 2. Surface 19b preferably faces the piston 15.

Still further, as shown in FIG. 4, the turbine wall 2 may, in at least one embodiment of the present invention, have a portion 19c, which portion 19c can preferably be one continuous piece. Portion 19c can preferably taper directly away from turbine wall 2, and then curve towards housing wall 7. In an additional alternative embodiment of the present invention, turbine wall 2 may have a portion 19d which can preferably be a separate component from portion 19c. Portions 19c and 19d could then preferably be connected to one another by welding, or by providing fingers on either portion 19c or portion 19d, as discussed above.

In an alternative embodiment of the present invention, portion 19c could be considered to be a projection of the turbine wall 2. This projection may be continuous about the circumference of the turbine wheel 10, or alternatively, there could be a number of projections about the turbine wheel 10. The number of projections could be one, two, three, four, five, six, seven, eight, nine, ten, eleven, twelve, thirteen, fourteen, fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, thirty-one, thirty-two, thirty-three, thirty-four, thirty-five, thirty-six, thirty-seven, thirty-eight, thirty-nine, or forty. It should be noted that the lower numbers given above, such as one, two, three, or four, would most likely not be adequate, however, it is conceivable that these lower numbers could be adequate in some cases. It should also be noted that the number of projections is not to be taken as limited to those given above. The projection could then be folded or bent back towards housing wall 7, and the friction plate 3 could preferably be attached to portion 19c.

It is to be understood that the connection between the friction plate 3 and the turbine wall 2 in the embodiments of the present invention illustrated in FIGS. 2, 3, 4, and 5 is preferably similar to the connection between friction surface 3 and turbine wall 2, as previously discussed with reference to FIG. 1.

Figure 5:
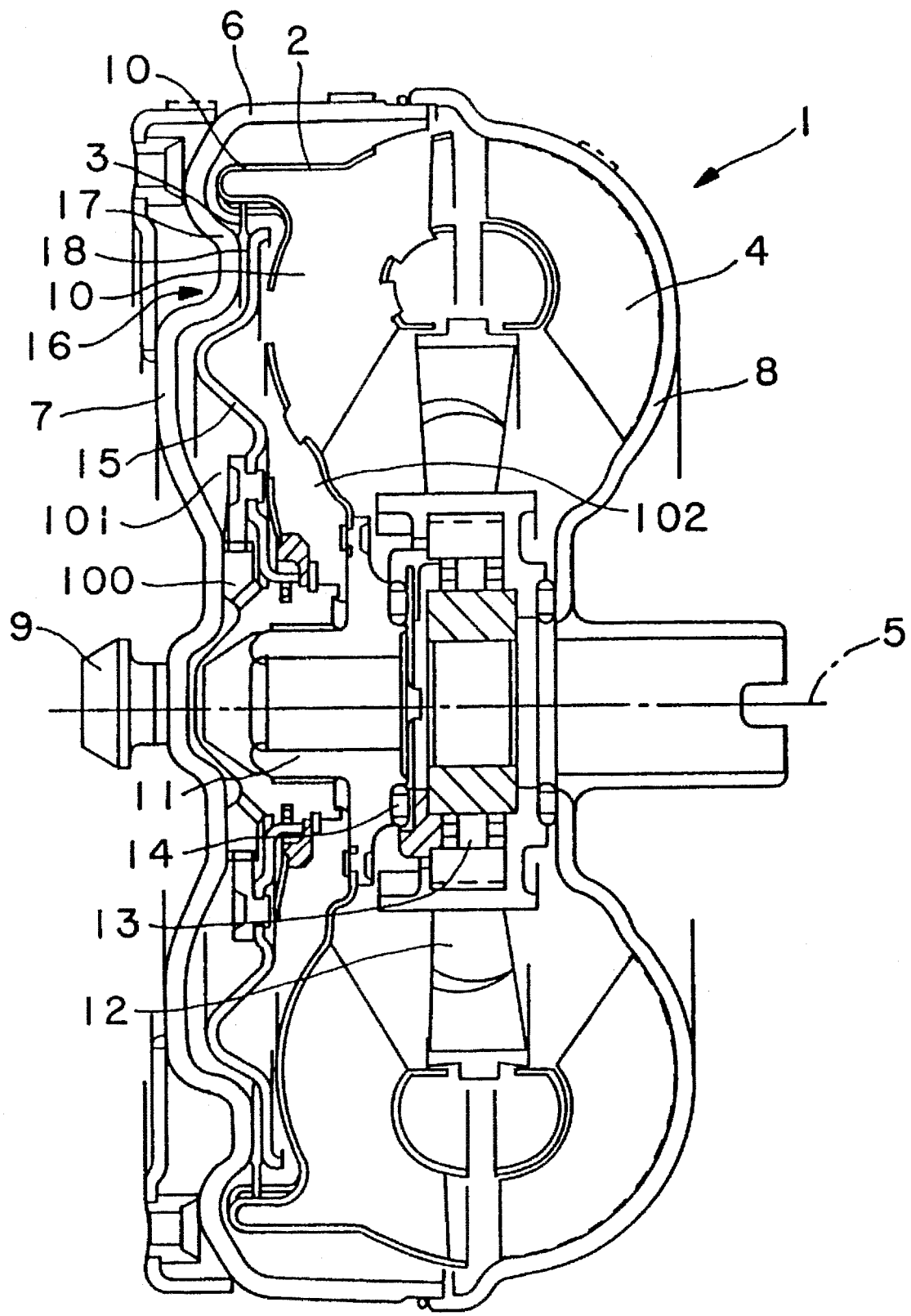
FIG. 5 shows an additional embodiment of a torque converter similar to that shown in FIG. 1, but shows various operational components of the torque converter.

For informational purposes, the functioning of the lockup clutch 16 in the torque converter 1 can generally be described as follows. The functioning of the lockup clutch 16 will be described with reference to FIG. 5. The embodiment shown in FIG. 5 is similar to that shown in FIG. 1, however, the lockup clutch 16 shown in FIGS. 2, 3, 4, may also function in a similar manner as that which will be described here.

Preferably, during torque transmission from the pump wheel 4 to the turbine wheel 10, the lockup clutch 16 can be opened by converter fluid being admitted under pressure, via a duct 100 into space 101. This space 101 is preferably located between the housing wall 7 and the piston 15. This admission of fluid can cause the piston 15 to be displaced axially towards the turbine wheel 10. As a consequence of the axial displacement of the piston 15 towards the turbine wheel 10, the friction plate 3 can be disposed freely between friction surfaces 17 and 18 (i.e. the friction plate 3 will preferably not have any substantial contact with friction surfaces 17 and 18), and the friction plate 3 can, in at least one embodiment of the present invention, preferably revolve freely with the turbine wheel 10, thus disengaging the lockup clutch 16.

In order to engage the lockup clutch 16, an internal space 102 of the torque converter 1 can preferably be pressurized by connecting internal space 102 to the delivery side of a converter fluid pump (not shown). The internal space 101 between the housing wall 7 and the piston 15 can be relieved of pressure via the duct 100, so that a pressure difference can be produced. This pressure difference can then preferably cause the piston 15 to move preferably towards the housing wall 7, which would be to the left in FIG. 5. This movement by the piston 15 towards the housing wall 7 can then cause the friction surfaces 17 and 18 to preferably clamp the friction plate 3 between them, and thus engage the lockup clutch 16. During this engagement of the lockup clutch 16, sealing can take place at the friction surfaces 17 and 18, so that pressure in the torque converter 1 can preferably automatically build up.

Further, the present invention may operate in a manner analogous to the torque converter disclosed in U.S. Pat. No. 4,926,988 which issued to Kundermann on May 22, 1990, entitled "Hydrodynamic Clutch".

Figure 6:
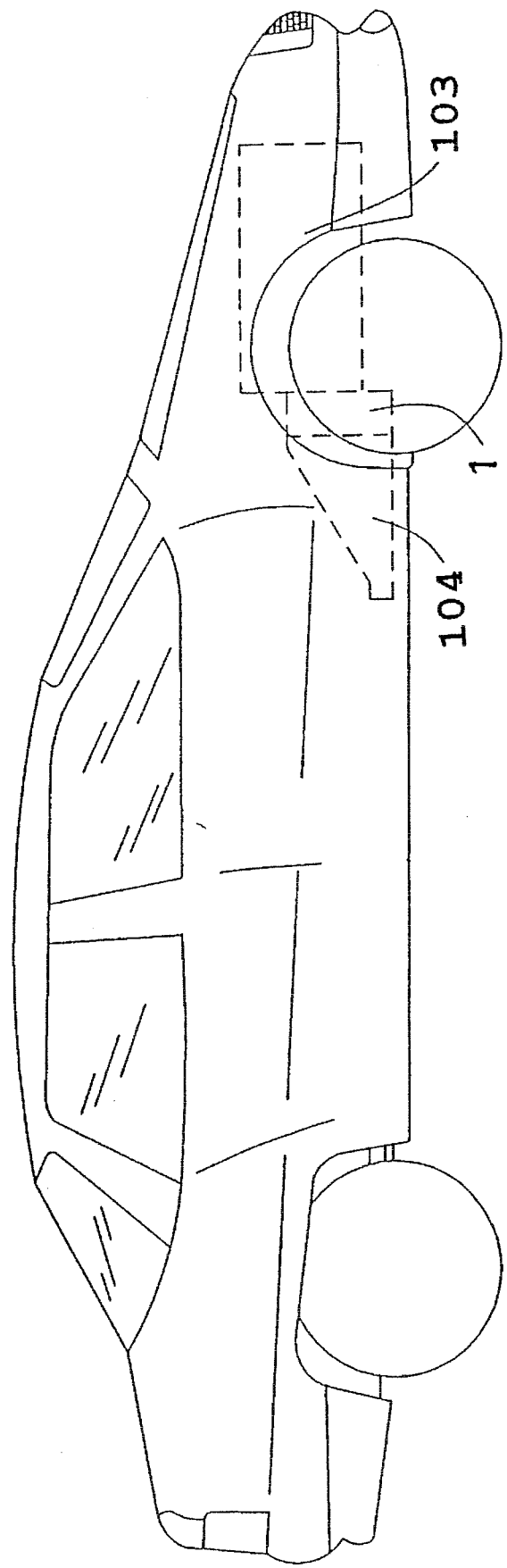
FIG. 6 shows a typical motor vehicle which incorporates the present invention.

FIG. 6 shows what could be considered to be a typical motor vehicle. Such a motor vehicle will generally include an internal combustion engine 103 mounted in a forward portion thereof. The motor vehicle will also typically have a transmission 104, and a drive shaft (not shown) for transmitting mechanical power generated by the engine 103 to the wheels. Further, if the transmission 104 is an automatic transmission, the drive train will also typically include a torque converter 1, for engaging the engine 103 with the transmission 104.

Figure 7:
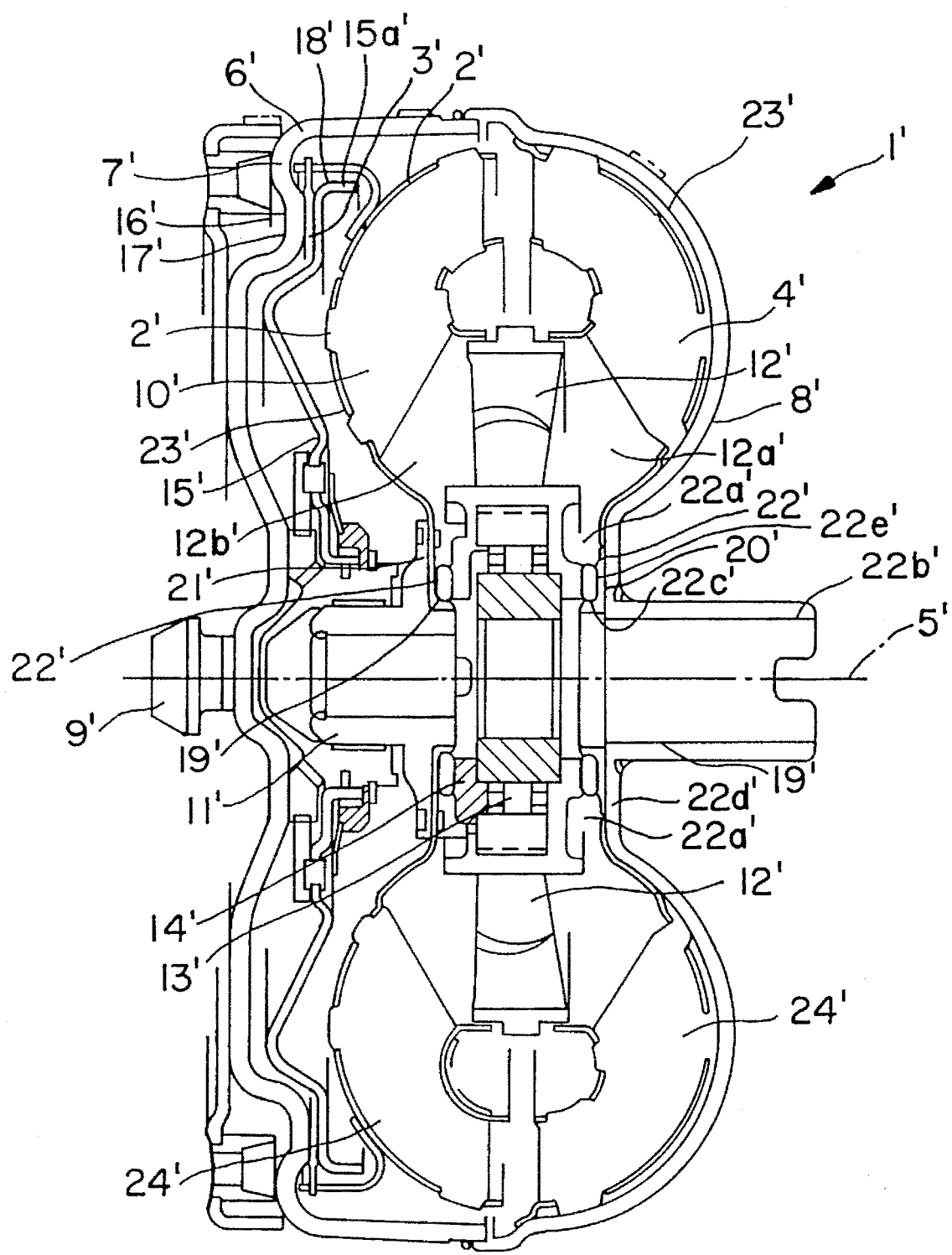
FIG. 7 shows a longitudinal section through an additional embodiment of a hydrokinetic torque converter.
Figure 8:
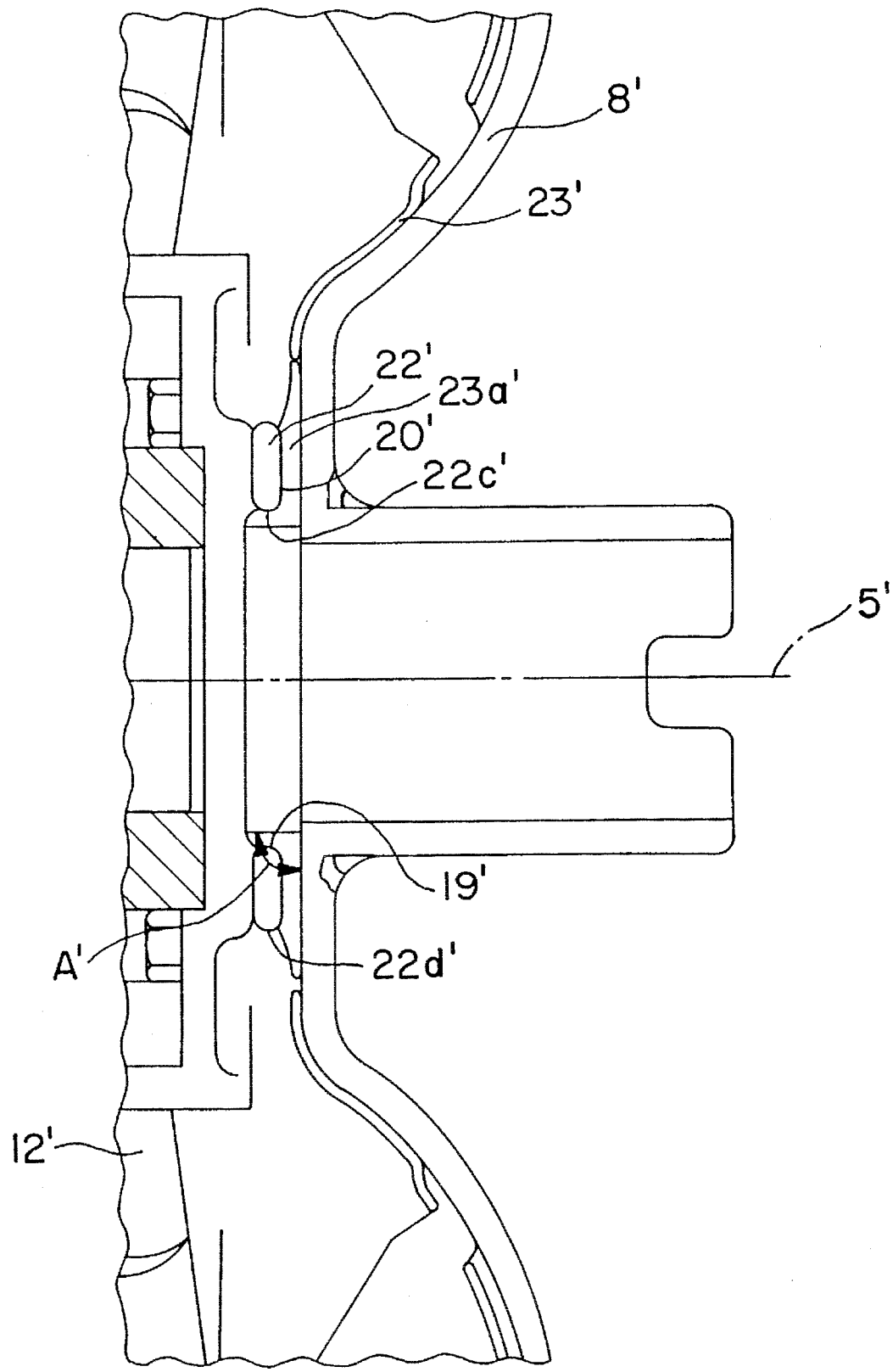
FIG. 8 shows an enlarged portion of FIG. 7.

FIGS. 7 and 8 show additional embodiments of the present invention which illustrate examples of bearings which may be used in conjunction with the embodiments of the present invention shown in FIGS. 1 through 6.

FIG. 7 shows a longitudinal section through a hydrokinetic torque converter 1' which is oriented concentric to an axis of rotation 5'. The internal combustion engine (not shown) is preferably located on the left with regard to FIG. 7, and can preferably be non-rotationally connected to the housing 6'. The housing 6' can preferably include a housing wall 7' near the drive of the internal combustion engine and a housing wall 8' away from the drive. In a radially inner area of the housing wall 7', the housing wall 7' is preferably rigidly connected to a guide hub 9', which guide hub 9' is preferably guided radially by an extension in the flywheel or in the crankshaft of an internal combustion engine. The housing wall 8' away from the drive is preferably combined with the pump wheel 4' of the hydrokinetic torque converter 1' into a single component. A turbine wheel 10' is preferably located between the pump wheel 4' and the housing wall 7' near the drive of the internal combustion engine. The turbine wheel 10' is preferably rigidly connected to a turbine wheel hub 11', which hub 11' is preferably located by means of gear teeth on an output shaft (not shown). Between the turbine wheel 10' and the pump wheel 4' there is preferably a stator 12', which stator 12' is preferably guided by means of a freewheel mechanism 13' and a blade wheel hub 14', which blade wheel hub 14' is preferably mounted by means of gear teeth on a tube (not shown) which is fixed to the housing.

In accordance with a preferred embodiment of the present invention, the stator 12' may include areas 12a' and 12b', as shown in FIG. 7.

In accordance with yet an additional embodiment of the present invention, area 12a' can preferably be a component of the pump wheel 4', and area 12b' can preferably be a component of the turbine wheel 10'.

In accordance with yet an additional embodiment of the present invention, area 12a' can preferably be a component of the turbine wheel 10'.

The piston 15' of the lock-up clutch 16' is preferably located between the turbine wheel 10' and the housing wall 7' near the drive of the internal combustion engine. The piston 15', in the vicinity of its outside diameter pointing away from the housing wall 7', is preferably provided with a reinforcement collar 15a', and with a friction surface 17', which friction surface 17' preferably faces the housing wall 7'. Near this portion of the diameter of the piston 15', on the inside of the housing wall 7', there is preferably an additional friction surface 18'. Preferably, friction surface 18' is opposite the friction surface 17' of the piston 15'. Between the two friction surfaces 17' and 18' there is preferably a friction plate 3', which friction plate 3' preferably extends radially outward beyond the piston 15', where the friction plate 3' is preferably connected essentially non-rotationally to the turbine wheel 10'.

Axial bearings 22' are preferably located in the radially inner area both of the pump wheel 4' and of the turbine wheel 10'. The mountings 20' and 21' for the bearings 22' preferably have a flange 19', which flange 19', according to at least one preferred embodiment of the present invention, is preferably a component of an outer shell 23'. In accordance with such a design, the axial bearings 22' can also preferably move in the axial direction, as a function of the tolerances involved, when exposed to static and dynamic pressure.

In at least one embodiment of the present invention, outer shell 23' preferably surrounds the blades 24' of the pump wheel 4', as well as the blades 24' of the turbine wheel 10'. The outer shell 23' can preferably be disposed immediately adjacent to, and essentially follow the inner contour of, housing wall 8', and can preferably be suitably secured or connected to housing wall 8', such as by welding. Further, turbine wall 2', in at least one embodiment of the present invention, is preferably a component of outer shell 23'.

The flanges 19' of mountings 20', 21', in at least one embodiment of the present invention, can preferably serve as a concentric guide for the bearings 22'. Further, the flanges 19' can preferably be in contact with the innermost circumferential surface 22c' of the bearings 22', this circumferential surface 22c' preferably being disposed in a direction substantially parallel to the axis of rotation 5'. Further, the flanges 19' can preferably extend axially from the outer shell 23' towards the stator 12'. Thus, an angle A' (see FIG. 8) of approximately 90° can preferably be formed between the outer shell 23' and the flanges 19'.

The flanges 19' can have an essentially continuous circumference. However, if increased cooling of the bearings 22' is desired, the flanges 19' can preferably be machined or casted to include radial and/or axial grooves or slots, which slots could possibly aid in cooling and/or lubricating the bearings 22' during operation by permitting converter fluid to come in contact with additional surfaces of the bearings 22'.

In accordance with an additional embodiment of the present invention, the bearings 22' are preferably exposed to converter fluid in radially outward areas 22a'. Essentially, this feature may represent a substantial improvement over torque converters of the past, which essentially had bearings which were, in some cases, typically secured in these radially outward areas 22a' by a type of flange or lip structure possibly located on the stator 12' or stator hub. Since the bearings 22' can experience a substantial increase in temperature during operation of the torque converter 1', the open areas 22a', which preferably allow converter fluid to come into contact with the bearings 22', can play a substantial role in cooling the bearings 22'. This cooling can preferably prevent unnecessary wear or possibly even failure of the bearings 22'.

It is also believed that the elimination of a securing flange or lip in the radially outward areas 22a' of the bearings 22', as discussed above, can also contribute to less wear along the outermost circumferential surface 22d' of the bearings 22', because the outermost circumferential surface 22d' of the bearings 22', in at least one embodiment of the present invention, are essentially only in contact with converter fluid. Thus, the friction forces on this part 22d' of the bearings 22' can eliminated, or at least significantly reduced, as a result.

FIG. 8 shows an enlarged portion of FIG. 7 in the vicinity of the of the bearings 22' and the flange 19'. In accordance with at least one embodiment of the present invention as shown in FIG. 8, the flange 19' of the outer shell 23' can preferably extend in a substantially axial direction towards the stator 12'. Thus, as discussed above, the flange 19' can preferably be disposed at an angle of about 90° with respect to a portion 23a' of outer shell 23'. In an alternative embodiment of the present invention, the flange 19' could conceivably be disposed at somewhat greater or lesser angle than 90°.

As also discussed above, the flange 19' of mountings 20' and 21', in at least one embodiment of the present invention, is preferably incorporated into the outer shell 23' of the pump wheel 4' and the turbine wheel 10'. In torque converters of the past, this flange 19' may typically have been incorporated into the stator 12', or possibly the guide hubs of the pump wheel 4', the guide hub of the stator 12' or the guide hub of the turbine wheel 10'. Comparatively, one distinct advantage of the design of the present invention may be found in that, by moving at least the bearing 22' of the pump wheel 4' axially outwardly and closer to housing wall 8' and away from the stator 12', any excess heat accumulated in and around the bearing 22' can be conducted away from the bearing 22', essentially into the output shaft 22b' (see FIG. 7) of the pump wheel 4', into the outer shell 23', and also possibly into the housing wall 8'. Further, by incorporating the bearing 22' of the turbine wheel 10' into the outer shell 23' of the turbine wheel 10' and away from the stator 12', the excess heat accumulated in and around this bearing 22' can be conducted away from the bearing 22', and essentially into the outer shell 23'. Still further, with regard to the bearing 22' nearest housing wall 8', by configuring outer shell 23' in accordance with the present invention, it may be possible to make outer shell 23' thinner as compared to torque converters of the past, thus permitting an even more rapid conduction of heat from the bearings 22' into housing wall 8'.

Thus, in accordance with at least one embodiment of the present invention, and with regard to both of the bearings 22' of the pump wheel 4' and the turbine wheel 10', better heat transfer can preferably be achieved between the outer radial circumferential surface 22e' of the bearings 22' (which surface 22e' faces housing 8' as shown in FIG. 8), and the outer shell 23' of the turbine wheel 10' and the pump wheel 4'. Thus, by conducting at least some heat out of and away from the bearings 22', axial expansion and possibly axial contraction of the bearings can preferably be reduced. Further, by reducing the axial expansion and contraction of the bearings 22', due to excessive heating of the bearings 22' during operation, the bearings 22' may have a better chance of remaining correctly positioned in their respective mountings 20', 21'.

As mentioned hereinabove, the bearings 22' can preferably move in the axial direction, and possibly in the radial direction, as a function of the manufacturing tolerances involved.

Since the bearings 22' can expand or contract during operation due to heat, this expansion or contraction should typically be accounted for, in conjunction with the manufacturing tolerances of the bearings 22', when forming the mountings 20' and 21', in order to keep the bearings 22' positioned correctly within the mountings 20', 21'. Since the bearings 22' can now be cooled more effectively and efficiently, as discussed above, the expansion of the bearings 22' can essentially be substantially reduced, and thus the total tolerance of the bearings 22' can possibly be made smaller, whereby a tighter tolerance can be utilized or, alternatively, since the temperature changes may be decreased, as discussed above, the tolerance could be increased, whereby a looser tolerance could be utilized. A looser tolerance can then essentially result in lower manufacturing costs.

The structural aspects of the torque converter 1' shown in FIGS. 7 and 8, with exception to the bearings 22', mountings 20', 21' and immediate surrounding structures, can be considered to be similar to the structural aspects of the torque converter disclosed in German Laid Open Patent Application DE-OS 38 23 210, cited previously herein, which corresponds to U.S. Pat. No. 4,926,988, also cited previously herein.

It will be appreciated from the foregoing that according to an additional embodiment of the present invention, at least part of the housing wall near the drive and the components holding the corresponding friction plate or the several friction plates can be designed as one piece, thus forming a positive interlock.

One advantage of this configuration in this alternative embodiment is that with an appropriate structure and geometric configuration of the turbine wheel, the corresponding fastening components for the friction plate can essentially be eliminated.

In yet an additional economical embodiment of the present invention which has advantages from the point of view of manufacturing technology, the housing wall and the components can preferably be shaped in a non-cutting manner, and can preferably be designed as one piece. By means of an appropriate shaping or structural geometry, the turbine wheel housing wall near the drive can be manufactured preferably from sheet metal in a non-cutting manner.

In yet an additional geometrically advantageous embodiment, the housing wall preferably first extends axially toward the friction plate, and then toward the pump wheel.

In yet another additional advantageous embodiment, the housing wall, starting from the pump wheel, preferably extends axially toward the friction plate.

An additional essential characterizing feature is that the the housing wall, can preferably be designed as a deep-drawn part.

In an additional configuration, the friction plate can preferably be connected essentially directly to the housing wall.

One feature of the invention resides broadly in the hydrokinetic torque converter with lock-up clutch, consisting of a housing driven by an internal combustion engine with a housing wall near the drive which is provided with a concentric guide hub, a pump wheel integrated into the housing wall away from the drive, a turbine wheel located between the pump wheel and the housing wall near the drive, which turbine wheel is non-rotationally connected by means of a turbine wheel hub to the output, a second stator located between the two, and a lock-up clutch between the housing wall near the drive and the turbine wheel, consisting of a piston, which in the radially external portion on the side facing the housing wall near the drive has a friction surface, which is opposite a corresponding friction surface of the housing wall, and in its radially inner portion is sealed in relation to a hub, and both the space between the piston and the housing wall near the drive and the space between the piston and the housing wall away from the drive each have a connection for pressurizable converter fluid, characterized by the fact that the turbine wall 2 near the drive and the components holding the corresponding friction plate 3 or the several friction plates 3 are designed as one piece and form a positive interlock.

Another feature of the invention resides broadly in the torque converter characterized by the fact that the turbine wall 2 and the components are shaped in a non-cutting manner and are designed as one piece.

Yet another feature of the invention resides broadly in the torque converter characterized by the fact that the turbine wall 2 first extends axially toward the friction plate 3, and then toward the pump wheel 4.

Still another feature of the invention resides broadly in the torque converter characterized by the fact that the turbine wall 2, starting from the pump wheel 4, extends axially toward the friction plate 3.

A further feature of the invention resides broadly in the torque converter characterized by the fact that the turbine wall 2 is designed as a deep-drawn part.

Another feature of the invention resides broadly in the torque converter characterized by the fact that the friction plate 3 is connected directly to the turbine wall 2.

Types of torque converters and components therefor, which may be utilized in accordance with the embodiments of the present invention may be found in the following U.S. patents: U.S. Pat. No. 4,478,323 to Weissenberger on Oct. 23, 1984, entitled "Hydrodynamic Clutch with Torsional Vibration Damping"; U.S. Pat. No. 4,437,551 to Gimmler on Mar. 20, 1984, entitled "Hydrodynamic Torque Converter"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S. Pat. No. 4,071,125 to Jameson on Jan. 31, 1978, entitled "Power Transmission with Torque Converter Lockup Clutch".

Examples of materials which may be used to form various components of the present invention may be found in the following U.S. patents: U.S. Pat. No. 5,139,580, to Freier et al. on Aug. 18, 1992, entitled "Cold Rolled Sheet or Strip Steel and a Process for Production Thereof"; U.S. Pat. No. 5,041,166, to Matsuoka et al. on Aug. 20, 1991, entitled "Cold-rolled Steel Sheet for Deep Drawing and Method for Producing the Same"; and U.S. Pat. No. 4,517,031 to Takasaki on May 14, 1985, entitled "Method of Manufacturing Cold Rolled Steel Sheets for Extra Deep Drawing With an Excellent Press Formability".

Methods of deep drawing which may be used to form various components of the present invention may be found in the following U.S. patents: U.S. Pat. No. 4,532,793 to Helmut on Aug. 6, 1985, entitled "Method for Deep-drawing Sheet Metal and an Apparatus for Carrying Out the Method"; U.S. Pat. No. 4,414,836 to Saunders on Nov. 15, 1983, entitled "Method of and Apparatus for Deep Drawing Metal Containers"; U.S. Pat. No. 4,290,293 to Selines on Sep. 22, 1981, entitled "Method for Deep Drawing"; and U.S. Pat. No. 4,354,370 to Ullman on Oct. 19, 1982, entitled "Method for Deep Drawing Sheet Metal".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic lockup torque converter such as for a motor vehicle, said torque converter comprising:

a longitudinal axis;

said torque converter being disposed substantially concentrically about said longitudinal axis;

a housing;

said housing comprising:
   a first housing wall portion having means for being disposed adjacent a source of torque;
   a second housing wall portion disposed at an axial distance from said first housing wall portion;

a pump wheel, said pump wheel being disposed adjacent said second housing wall portion;

a turbine wheel, said turbine wheel being disposed between said pump wheel and said first housing wall portion;

said turbine wheel having means for being disposed on an output shaft;

a lockup clutch disposed between said first housing wall portion and said turbine wheel;

said lockup clutch comprising:
   at least one friction plate disposed between said turbine wheel and said first housing wall portion;

said turbine wheel comprising:
   a turbine wall portion;
   said turbine wall portion comprising:
      a first portion and a second portion;
      an inner turbine wall surface comprising:
         a first portion disposed adjacent blades of said turbine wheel and disposed towards said pump wheel; and
         a second portion extending axially outwardly towards said first housing wall portion;
      an outer turbine wall surface disposed opposite said inner turbine wall surface and disposed away from the blades of said turbine wheel;

said first portion of said inner turbine wall surface being disposed on said first portion of said turbine wall portion;
   said second portion of said inner turbine wall surface being disposed on said second portion of said turbine wall portion; and
   means for connecting said turbine wall portion to said at least one friction plate, said means for connecting being at least substantially adjacent to said second portion of said turbine wall portion.

2. The torque converter according to claim 1 wherein said turbine wall portion comprising said first and second portions comprises a single piece.

3. The torque converter according to claim 2 wherein said turbine wall portion comprising said first and second portions comprises a single, unitary, continuous piece made from a single piece of a homogenous, continuous material.

4. The torque converter according to claim 3 wherein said friction plate comprises means for being directly attached to said second portion of said turbine wall portion.

5. The torque converter according to claim 4 wherein:

said lockup clutch further comprises:
   a piston disposed between said turbine wheel and said at least one friction plate; and said at least one friction plate further comprises:
   a first means for making contact with said piston during engagement of said lockup clutch; and
   a second means for making contact with said first housing wall portion during engagement of said lockup clutch, said second means for making contact being disposed opposite of said first means for making contact and facing said first means for making contact.

6. The torque converter according to claim 5 wherein said second portion of said turbine wall portion extends generally axially towards said friction plate.

7. The torque converter according to claim 6 wherein said second portion of said turbine wall portion comprises:

a first part disposed in a direction substantially aligned with said longitudinal axis, said first part extending towards said friction plate;

a second part disposed radially away from said first part, and disposed in a direction substantially aligned with said longitudinal axis, said second part extending towards said pump wheel; and said friction plate being attached to at least a portion of said second part.

8. The torque converter according to claim 7 wherein said second portion of said turbine wall portion has been formed by deep-drawing.

9. The torque converter according to claim 8 wherein:

said second portion of said turbine wall portion further comprises an intermediate part disposed between said first and second parts;

said first part of said second portion of said-turbine wall portion comprises a substantially straight portion disposed in a direction substantially parallel to said longitudinal axis;

said second part of said second portion of said turbine wall portion comprises a substantially straight portion disposed in a direction substantially parallel to said first part;

said intermediate part of said second portion of said turbine wall portion is disposed in a direction substantially perpendicular to said first and second parts;

said second portion of said turbine wall portion further comprises at least two curved parts, one of said at least two curved parts being disposed between said first part and said intermediate part, the other of said at least two curved parts being disposed between said second part and said intermediate part;

the source of torque comprises an internal combustion engine having a crankshaft;

said housing is configured for being driven by the internal combustion engine;

said means for being disposed adjacent a source of torque comprises a guide hub;

said pump wheel comprises said second housing wall portion;

said means for being disposed on an output shaft comprises a turbine wheel hub disposed on the output shaft, said turbine wheel being non-rotatably attached to the output shaft, the output shaft having gear teeth;

said turbine wheel hub comprises gear teeth for engaging with the gear teeth of the output shaft;

said torque converter further comprises a stator disposed between said turbine wheel and said pump wheel, said stator having a guide hub;

said piston comprises:
an outer portion disposed radially away from said longitudinal axis;
said outer portion of said piston comprises a friction surface disposed to face towards said first housing wall portion and to contact said first means for making contact of said friction plate when said lockup clutch is engaged; and
a collar disposed at said outer portion of said piston, said collar extending axially towards said pump wheel;

said first housing wall portion comprises a friction surface disposed to face towards said friction surface of said piston and to contact said second means for making contact of said friction plate;

said torque converter further comprises a piston guide hub, said piston and said piston guide hub being configured for making sealing contact with one another;

said torque converter further comprises:
a first substantially open portion disposed between said piston and said first housing wall portion;
a second substantially open portion disposed between said piston and said second housing wall portion;
said first substantially open portion of said torque converter comprises a first means for permitting flow of converter fluid;
said second substantially open portion of said torque converter comprises a second means for permitting flow of converter fluid;

said turbine wheel comprises an outermost portion disposed maximally away from said said longitudinal axis and in a radial direction from said longitudinal axis;

said second portion of said turbine wall portion is disposed substantially adjacent said outermost portion of said turbine wheel;

said first housing wall portion comprises an indented portion disposed adjacent said friction plate, said indented portion being indented towards said pump wheel;

said indented portion comprises said friction surface of said first housing wall portion; and at least said indented portion of said first housing wall portion has been formed by deep-drawing.

10. The torque converter according to claim 6 wherein:
said second portion of said turbine wall portion comprises:
at least one projection, said at least one projection having a bent portion extending towards said friction plate; and
said at least one projection comprises said connecting means for connecting said turbine wall portion to said at least one friction plate.

11. The torque converter according to claim 10 wherein said bent portion of said at least one projection comprises a folded portion extending towards said friction plate, said folded portion being folded against said first portion of said turbine wall portion.

12. The torque converter according to claim 11 wherein:
said folded portion of said at least one projection comprises:
a first curved portion, said first curved portion curving radially inwardly towards said longitudinal axis; and
a second curved portion, said second curved portion curving radially outwardly from said longitudinal axis;

the source of torque comprises an internal combustion engine having a crankshaft;

said housing is configured for being driven by the internal combustion engine;

said means for being disposed adjacent a source of torque comprises a guide hub;

said pump wheel comprises said second housing wall portion;

said means for being disposed on an output shaft comprises a turbine wheel hub disposed on the output shaft, said turbine wheel being non-rotatably attached to the output shaft, the output shaft having gear teeth;

said turbine wheel hub comprises gear teeth for engaging with the gear teeth of the output shaft;

said torque converter further comprises a stator disposed between said turbine wheel and said pump wheel, said stator having a guide hub;

said piston comprises:
an outer portion disposed radially away from said longitudinal axis;
said outer portion of said piston comprises a friction surface disposed to face towards said first housing wall portion and to contact said first means for making contact of said friction plate when said lockup clutch is engaged; and
a collar disposed at said outer portion of said piston, said collar extending axially towards said pump wheel;

said first housing wall portion comprises a friction surface disposed to face towards said friction surface of said piston and to contact said second means for making contact of said friction plate;

said torque converter further comprises a piston guide hub, said piston and said piston guide hub being configured for making sealing contact with one another;

said torque converter further comprises:
a first substantially open portion disposed between said piston and said first housing wall portion;
a second substantially open portion disposed between said piston and said second housing wall portion;
said first substantially open portion of said torque converter comprises a first means for permitting flow of converter fluid;

said second substantially open portion of said torque converter comprises a second means for permitting flow of converter fluid;

said turbine wheel comprises an outermost portion disposed maximally away from said said longitudinal axis and in a radial direction from said longitudinal axis;

said second portion of said turbine wall portion is disposed substantially adjacent said outermost portion of said turbine wheel;

said first housing wall portion comprises an indented portion disposed adjacent said friction plate, said indented portion being indented towards said pump wheel;

said indented portion comprises said friction surface of said first housing wall portion; and at least said indented portion of said first housing wall portion has been formed by deep-drawing.

13. The torque converter according to claim 10 wherein:

said at least one projection further comprises an additional portion having another bend, said additional portion being disposed in a direction substantially aligned with said longitudinal axis, said additional portion of said at least one projection extending from said bent portion towards said second housing wall portion.

14. The torque converter according to claim 13 wherein said additional portion of said at least one projection comprises a folded portion extending towards said second housing wall portion, said folded portion being folded against said bent portion.

15. The torque converter according to claim 14 wherein:

said additional portion of said at least one projection comprises a substantially straight portion disposed in a direction substantially parallel to said longitudinal axis;

the source of torque comprises an internal combustion engine having a crankshaft;

said housing is configured for being driven by the internal combustion engine;

said means for being disposed on an output shaft comprises a guide hub;

said pump wheel comprises said second housing wall portion;

said means for being disposed of said turbine wheel comprises a turbine wheel hub disposed on the output shaft, said turbine wheel being non-rotatably attached to the output shaft, the output shaft having gear teeth;

said turbine wheel hub comprises gear teeth for engaging with the gear teeth of the output shaft;

said torque converter further comprises a stator disposed between said turbine wheel and said pump wheel, said stator having a guide hub;

said piston comprises:
an outer portion disposed radially away from said longitudinal axis;
said outer portion of said piston comprises a friction surface disposed to face towards said first housing wall portion and to contact said first means for making contact of said friction plate when said lockup clutch is engaged; and
a collar disposed at said outer portion of said piston, said collar extending axially towards said pump wheel;

said first housing wall portion comprises a friction surface disposed to face towards said friction surface of said piston and to contact said second means for making contact of said friction plate;

said torque converter further comprises a piston guide hub, said piston and said piston guide hub being configured for making sealing contact with one another;

said torque converter further comprises:
a first substantially open portion disposed between said piston and said first housing wall portion;
a second substantially open portion disposed between said piston and said second housing wall portion;
said first substantially open portion of said torque converter comprises a first means for permitting flow of converter fluid;
said second substantially open portion of said torque converter comprises a second means for permitting flow of converter fluid;

said turbine wheel comprises an outermost portion disposed maximally away from said said longitudinal axis and in a radial direction from said longitudinal axis;

said second portion of said turbine wall portion is disposed substantially adjacent said outermost portion of said turbine wheel;

said first housing wall portion comprises an indented portion disposed adjacent said friction plate, said indented portion being indented towards said pump wheel;

said indented portion comprises said friction surface of said first housing wall portion; and at least said indented portion of said first housing wall portion has been formed by deep-drawing.

16. The torque converter according to claim 10 wherein:

said torque converter comprises an outermost portion on said housing disposed maximally away from said longitudinal axis in a radial direction from said longitudinal axis;

said turbine wall portion comprises an third portion, said third portion extending from said bent portion of said second portion of said turbine wall portion to said outermost portion of said torque converter, said third portion comprising a separate piece from said single piece.

17. The torque converter according to claim 16 wherein:

the source of torque comprises an internal combustion engine having a crankshaft;

said housing is configured for being driven by the internal combustion engine;

said means for being disposed on an output shaft comprises a guide hub;

said pump wheel comprises said second housing wall portion;

said means for being disposed adjacent a source of torque comprises a turbine wheel hub disposed on the output shaft, said turbine wheel being non-rotatably attached to the output shaft, the output shaft having gear teeth;

said turbine wheel hub comprises gear teeth for engaging with the gear teeth of the output shaft;

said torque converter further comprises a stator disposed between said turbine wheel and said pump wheel, said stator having a guide hub;

said piston comprises:
an outer portion disposed radially away from said longitudinal axis;
said outer portion of said piston comprises a friction surface disposed to face towards said first housing wall portion and to contact said first means for making contact of said friction plate when said lockup clutch is engaged; and a collar disposed at said outer portion of said piston, said collar extending axially towards said pump wheel;

said first housing wall portion comprises a friction surface disposed to face towards said friction surface of said piston and to contact said second means for making contact of said friction plate;

said torque converter further comprises a piston guide hub, said piston and said piston guide hub being configured for making sealing contact with one another;

said torque converter further comprises:

a first substantially open portion disposed between said piston and said first housing wall portion;

a second substantially open portion disposed between said piston and said second housing wall portion;

said first substantially open portion of said torque converter comprises a first means for permitting flow of converter fluid;

said second substantially open portion of said torque converter comprises a second means for permitting flow of converter fluid;

said turbine wheel comprises an outermost portion disposed maximally away from said said longitudinal axis and in a radial direction from said longitudinal axis;

said second portion of said turbine wall portion is disposed substantially adjacent said outermost portion of said turbine wheel;

said first housing wall portion comprises an indented portion disposed adjacent said friction plate, said indented portion being indented towards said pump wheel;

said indented portion comprises said friction surface of said first housing wall portion; and at least said indented portion of said first housing wall portion has been formed by deep-drawing.

18. A method of making a hydrokinetic lockup torque converter for a motor vehicle, said torque converter comprising: a longitudinal axis; said torque converter being disposed substantially concentrically about said longitudinal axis; a housing; said housing comprising: a first housing wall portion having means for being disposed adjacent a source of torque; a second housing wall portion disposed at an axial distance from said first housing wall portion; a pump wheel, said pump wheel being disposed adjacent said second housing wall portion; a turbine wheel, said turbine wheel being disposed between said pump wheel and said first housing wall portion; said turbine wheel having means for being disposed on an output shaft; a lockup clutch disposed between said first housing wall portion and said turbine wheel; said lockup clutch comprising at least one friction plate disposed between said turbine wheel and said first housing wall portion; said turbine wheel comprising a turbine wall portion; said turbine wall portion-comprising: a first portion and a second portion; an inner turbine wall surface comprising: a first portion disposed adjacent blades of said turbine wheel and disposed towards said pump wheel, and a second portion extending axially outwardly towards said first housing wall portion; an outer turbine wall surface disposed opposite said inner turbine wall surface and disposed away from the blades of said turbine wheel; said first portion of said inner turbine wall surface being disposed on said first portion of said turbine wall portion; said second portion of said inner turbine wall surface being disposed on said second portion of said turbine wall portion; said turbine wheel further comprising means for connecting said turbine wall portion to said at least one friction plate, said means for connecting being at least substantially adjacent to said second portion of said inner turbine wall surface; said method comprising the steps of:

providing a housing;

said step of providing said housing comprising:

providing a first housing wall portion having means for being disposed adjacent a source of torque;

providing a second housing wall portion;

providing a pump wheel;

providing a turbine wheel, said turbine wheel having means for being disposed on an output shaft;

providing a lockup clutch;

said step of providing said lockup clutch comprising:

providing at least one friction plate;

said step of providing said turbine wheel comprising:

providing a turbine wall portion;

said step of providing said turbine wall portion comprising:

providing a first portion and a second portion;

providing an inner turbine wall surface;

said step of providing said inner turbine wall surface comprising:

providing a first portion; and providing a second portion extending axially outwardly towards said first housing wall portion;

providing an outer turbine wall surface;

providing means for connecting said turbine wall portion to said at least one friction plate;

said method further comprising the additional steps of:

disposing said second housing wall portion at an axial distance from said first housing wall portion;

disposing said pump wheel adjacent said second housing wall portion;

disposing said turbine wheel between said pump wheel and said first housing wall portion;

disposing said lockup clutch between said first housing wall portion and said turbine wheel;

disposing said friction plate between said turbine wheel and said first housing wall portion;

disposing said first portion of said inner turbine wall portion adjacent the blades of said turbine wheel and disposing said first portion of said inner turbine wall portion towards said pump wheel;

disposing said outer turbine wall surface opposite said inner turbine wall surface and disposing said outer turbine wall surface away from the blades of said turbine wheel;

disposing said connecting means at least substantially adjacent to said second portion of said turbine wall portion;

said method still further comprising the additional steps of:

forming said first portion of said inner turbine wall surface on said first portion of said turbine wall portion;

forming said second portion of said inner turbine wall surface on said second portion of said turbine wall portion, and extending said second portion axially outwardly towards said first housing wall portion; and attaching said friction plate to said connecting means of said turbine wall portion.

19. The method according to claim 18 wherein:

said step of providing said turbine wall portion further comprises forming said first and second portions of said turbine wall portion from a single piece;

said step of providing said turbine wall portion further comprises forming said first and second portions of said turbine wall portion from a single, unitary, continuous piece made from a single piece of a homogenous, continuous material;

said step of providing said friction plate comprises providing means for being directly attached to said second portion of said turbine wall portion;

directly attaching said friction plate to said second portion of said turbine wall portion with said means for being directly attached;

said step of providing of said lockup clutch further comprises providing a piston and disposing said piston between said turbine wheel and said at least one friction plate;

said step of providing said at least one friction plate further comprises:
  providing a first means for making contact with said piston during engagement of said lockup clutch;
  making contact with said piston during engagement of said lockup clutch with said first means for making contact;
  providing a second means for making contact with said first housing wall portion during engagement of said lockup clutch;
  disposing said second means for making contact opposite of said first means for making contact;
  making contact with said first housing wall during engagement of said lockup clutch with said second means for making contact;

said step of forming said second portion of said turbine wall surface further comprises extending said second portion axially towards said friction plate;

said step of forming said second portion of said turbine wall surface further comprises one of the following sets of steps a), b), c), and d):

a) providing a first part, disposing said first part in a direction substantially aligned with said longitudinal axis, and extending said first part towards said friction plate;

providing a second part, disposing said second part radially away from said first part, disposing said second part in a direction substantially aligned with said longitudinal axis, and extending said second part towards said pump wheel;

providing an intermediate part, disposing said intermediate part between said first and second parts;

attaching said friction plate to at least a portion of said second part;

forming said second portion of said turbine wall portion by deep-drawing;

said step of providing said first part of said second portion of said turbine wall portion comprises providing a substantially straight portion and disposing said substantially straight portion in a direction substantially parallel to said longitudinal axis;

said step of providing said second part of said second portion of said turbine wall portion comprises providing a substantially straight portion and disposing said substantially straight portion in a direction substantially parallel to said first part;

said step of providing said intermediate part of said second portion of said turbine wall portion comprises disposing said intermediate part in a direction substantially perpendicular to said first and second parts; and said step of providing said second portion of said turbine wall portion further comprises providing at least two curved parts, disposing one of said at least two curved parts between said first part and said intermediate part, and disposing the other of said at least two curved parts between said second part and said intermediate part; and b) providing at least one projection, bending said at least one projection to form a bent portion and extending said bent portion towards said friction plate;

said step of providing said at least one projection comprises said step of providing said connecting means for connecting said turbine wall portion to said at least one friction plate;

connecting said friction plate to said at least one projection with said connecting means;

said step of providing said at least one projection comprises folding said at least one projection to form a folded portion, extending said folded portion towards said friction plate, and folding said folded portion against said first portion of said turbine wall portion;

said step of forming said folded portion of said at least one projection comprises:
  providing a first curved portion, said first curved portion curving radially inwardly towards said longitudinal axis; and
  providing a second curved portion, said second curved portion curving radially outwardly from said longitudinal axis; and c) providing at least one projection, said step of providing at least one projection comprises bending said at least one projection to form a bent portion and extending said bent portion towards said friction plate;

said step of providing said at least one projection comprises said step of providing said connecting means;

connecting said friction plate to said at least one projection with said connecting means;

said step of providing said at least one projection further comprises providing an additional portion, bending said additional portion to form another bend, disposing said additional portion in a direction substantially aligned with said longitudinal axis, and extending said additional portion of said at least one projection from said bent portion towards said second housing wall portion;

said step of providing said additional portion of said at least one projection comprises folding said additional portion to form a folded portion, extending said folded portion towards said second housing wall portion, and folding said folded portion against said bent portion;

said step of providing said additional portion of said at least one projection comprises providing a substantially straight portion and disposing said substantially straight portion in a direction substantially parallel to said longitudinal axis; and d) providing at least one projection, said step of providing at least one projection comprises bending said at least one projection to form a bent portion and extending said bent portion towards said friction plate;

said step of providing at least one projection comprises said step of providing said connecting means for connecting said turbine wall portion to said at least one friction plate;

connecting said at least one friction plate to said turbine wall portion;

said method further comprises the step of providing an outermost portion on said torque converter on said housing and disposing said outermost portion maximally away from said longitudinal axis in a radial direction from said longitudinal axis; and said step of forming said turbine wall portion comprises forming a third portion and extending said third portion from said bent portion of said second portion of said turbine wall portion to said outermost portion of said torque converter, said step of forming said third portion comprises providing a separate piece from said single piece.

20. The method according to claim 19 wherein said method further comprises the step of configuring said torque converter such that:

the source of torque comprises an internal combustion engine having a crankshaft;

said housing is configured for being driven by the internal combustion engine;

said means for being disposed adjacent a source of torque comprises a guide hub;

said pump wheel comprises said second housing wall portion;

said means for being disposed on an output shaft comprises a turbine wheel hub disposed on the output shaft, said turbine wheel being non-rotatably attached to the output shaft, the output shaft having gear teeth;

said turbine wheel hub comprises gear teeth for engaging with the gear teeth of the output shaft;

said torque converter further comprises a stator disposed between said turbine wheel and said pump wheel, said stator having a guide hub;

said piston comprises:
an outer portion disposed radially away from said longitudinal axis;
said outer portion of said piston comprises a friction surface disposed to face towards said first housing wall portion and to contact said first means for making contact of said friction plate when said lockup clutch is engaged; and
a collar disposed at said outer portion of said piston, said collar extending axially towards said pump wheel;

said first housing wall portion comprises a friction surface disposed to face towards said friction surface of said piston and to contact said second means for making contact of said friction plate;

said torque converter further comprises a piston guide hub, said piston and said piston guide hub being configured for making sealing contact with one another;

said torque converter further comprises:
a first substantially open portion disposed between said piston and said first housing wall portion;
a second substantially open portion disposed between said piston and said second housing wall portion;
said first substantially open portion of said torque converter comprises a first means for permitting flow of converter fluid;
said second substantially open portion of said torque converter comprises a second means for permitting flow of converter fluid;

said turbine wheel comprises an outermost portion disposed maximally away from said said longitudinal axis and in a radial direction from said longitudinal axis;

said second portion of said turbine wall portion is disposed substantially adjacent said outermost portion of said turbine wheel;

said first housing wall portion comprises an indented portion disposed adjacent said friction plate, said indented portion being indented towards said pump wheel;

said indented portion comprises said friction surface of said first housing wall portion; and at least said indented portion of said first housing wall portion has been formed by deep-drawing.

* * * * *